(12) United States Patent
Xiao et al.

(10) Patent No.: US 10,651,511 B2
(45) Date of Patent: May 12, 2020

(54) WOUND CELL HAVING SINGLE-SIDE COATED AREAS

(71) Applicant: NINGDE AMPEREX TECHNOLOGY LIMITED, Ningde, Fujian Province (CN)

(72) Inventors: Liangzhen Xiao, Ningde (CN); Qiao Zeng, Ningde (CN); Kefei Wang, Ningde (CN)

(73) Assignee: NINGDE AMPEREX TECHNOLOGY LIMITED, Ningde, Fujian Province (CN)

( * ) Notice: Subject to any disclaimer, the term of this patent is extended or adjusted under 35 U.S.C. 154(b) by 89 days.

(21) Appl. No.: 15/649,820

(22) Filed: Jul. 14, 2017

(65) Prior Publication Data
US 2018/0083319 A1    Mar. 22, 2018

(30) Foreign Application Priority Data

Sep. 22, 2016  (CN) .................... 2016 2 1070386 U

(51) Int. Cl.
| | |
|---|---|
| *H01M 10/0587* | (2010.01) |
| *H01M 10/04* | (2006.01) |
| *H01M 10/0525* | (2010.01) |
| *H01M 10/12* | (2006.01) |
| *H01M 10/14* | (2006.01) |
| *H01M 10/28* | (2006.01) |

(52) U.S. Cl.
CPC ... *H01M 10/0587* (2013.01); *H01M 10/0431* (2013.01); *H01M 10/0459* (2013.01); *H01M 10/0525* (2013.01); *H01M 10/125* (2013.01); *H01M 10/14* (2013.01); *H01M 10/286* (2013.01)

(58) Field of Classification Search
CPC ......... H01M 10/0431; H01M 10/0459; H01M 10/0525; H01M 10/0587; H01M 10/14; H01M 10/125; H01M 10/286
See application file for complete search history.

(56) References Cited

U.S. PATENT DOCUMENTS

| | | | |
|---|---|---|---|
| 8,257,849 B2 * | 9/2012 | Uchida ............. | H01M 10/0431 29/623.1 |
| 2010/0285342 A1 * | 11/2010 | Lee ......................... | H01M 2/34 429/94 |

* cited by examiner

*Primary Examiner* — Maria Laios
(74) *Attorney, Agent, or Firm* — Tarolli, Sundheim, Covell & Tummino LLP

(57) ABSTRACT

Provided is a wound cell, formed by winding of a first and second separator, a first and second electrode plate from start ends thereof, outermost circle of second electrode plate includes second single-side coated area, surface of which facing center of the wound cell is second blank current collector area not coated with second active material, portion of first electrode plate opposite to second blank current collector area includes first single-side coated area, surface of which away from the center of the wound cell is first blank current collector area not coated with first active material; tail end of first electrode plate contains first blank foil area, portion of second electrode plate opposite to first blank foil area contains second blank foil area; start ends of first and second single-side coated area are located at two opposite sides in thickness direction of the cell.

10 Claims, 6 Drawing Sheets

WOUND CELL HAVING SINGLE-SIDE COATED AREAS

CROSS-REFERENCE TO RELATED APPLICATIONS

The present application claims priority to Chinese Patent Application No. 201621070386.4, filed on Sep. 22, 2016, the content of which is incorporated herein by reference in its entirety.

TECHNICAL FIELD

The present application relates to the field of secondary battery and, in particularly, relates to a wound cell.

BACKGROUND

At present, the polymeric Li-ion battery has more requirements on higher energy density, safety problem appeared therewith is also a big challenge. Many cells with high energy density cannot pass certain safety tests, such as nailing test and impact test. A common manner for improving nailing performance and impact performance is to adopt an external armor area formed by a double-layer uncoated cathode-anode current collector, however, such manner can only form an armor area on one surface of the cell, as shown in FIG. 1, it is easy to trigger safety problem when the area other than the armor area is suffered from external impact, which may lead to a great loss of energy density, and is a waste of material.

In view of the above, the present application is proposed.

SUMMARY

The object of the present application is to provide a wound cell.

In order to achieve the object of the present application, the adopted technical solution is:

The present application relates to a wound cell, the wound cell includes a flat-shaped cell formed by winding of a first separator, a first electrode plate, a second separator and a second electrode plate from start ends thereof, a first electrode tab is connected with the first electrode plate, a second electrode tab is connected with the second electrode plate; the first electrode plate includes a first current collector with a first active material coated on two opposite surfaces of the first current collector, the second electrode plate includes a second current collector with a second active material coated on two opposite surfaces of the second current collector, an outermost circle of the second electrode plate includes a second single-side coated area, a surface of the second single-side coated area facing a center of the wound cell is a second blank current collector area which is not coated with the second active material, a portion of the first electrode plate opposite to the second blank current collector area includes a first single-side coated area, a surface of the first single-side coated area away from the center of the wound cell is a first blank current collector area which is not coated with the first active material;

a tail end of the first electrode plate includes a first blank foil area, a portion of the second electrode plate opposite to the first blank foil area includes a second blank foil area;

with respect to a thickness direction of the flat-shaped cell, a start end of the first blank foil area and a start end of the second single-side coated area are respectively located at two opposite sides of the flat-shaped cell.

Preferably, in a projection along a thickness direction of the flat-shaped cell, the second single-side coated area is overlapped with the first electrode tab and/or the second electrode tab.

Preferably, in a projection along a thickness direction of the flat-shaped cell, the first blank foil area is overlapped with the first electrode tab and/or the second electrode tab.

Preferably, a length of the first blank foil area is larger than a length of the second blank foil area.

Preferably, a length of the first blank foil area is no larger than a length of the first single-side coated area, and/or a length of the second blank foil area is no larger than a length of the second single-side coated area.

Preferably, a length of the first separator and/or the second separator is larger than a length of the first blank foil area.

Preferably, a distance from the start end of the first separator to the first electrode tab is a length of a head portion of the first separator, a distance from the start end of the second separator to the first electrode tab is a length of a head portion of the second separator;

the head portion of the first separator and the head portion of the second separator are arranged in parallel along a width direction of the flat-shaped cell, or the head portion of the first separator is back folded in an interior of the flat-shaped cell to form a separator back folded section, or both the head portion of the first separator and the head portion of the second separator are back folded in an interior of the flat-shaped cell to form a separator back folded section; in a projection along the thickness direction of the flat-shaped cell, the separator back folded section does not overlap with either the first electrode tab or the second electrode tab.

Preferably; a distance from the start end of the second electrode plate to the second electrode tab is a length of a head portion of the second electrode plate, the head portion of the second electrode plate is back folded in an interior of the flat-shaped cell to form a second electrode plate back folded section; and/or a distance from the start end of the first electrode plate to the first electrode tab is a length of a head portion of the first electrode plate, the head portion of the first electrode plate is back folded in the interior of the flat-shaped cell to form a first electrode plate back folded section; in a projection along the thickness direction of the flat-shaped cell, the first electrode plate back folded section and/or the second electrode plate back folded section do not overlap with either the first electrode tab or the second electrode tab.

Preferably, the start end of the first separator is connected with the start end of the second separator.

Preferably, the first electrode plate is a positive electrode plate, the second electrode plate is a negative electrode plate; or, the first electrode plate is a negative electrode plate, the second electrode plate is a positive electrode plate.

Technical solutions of the present application have at least the following beneficial effects:

The present application, through improving the electrode plate design and winding structure, adopting the technical solution of single-side cathode or anode ending, forms an armor by blank cathode or anode current collector with single-side coated on a side along the thickness direction of the cell, and forms an armor by double-surface blank cathode or anode current collector on the other side along the width direction of the cell, so that armors are formed at both sides of the flat-shaped cell, thereby improving safety of the cell.

Moreover, the present application uses the electrode plate with single-side coated as the end, which can further reduce the cell thickness so as to improve the energy density of the battery.

Besides, the present application forms armors at both sides of the flat-shaped cell, which balances the thickness of the bended portion at two sides of the cell, so as to improve the cell flatness and prevent cell deformation.

REFERENCE SIGNS

Figure 1:
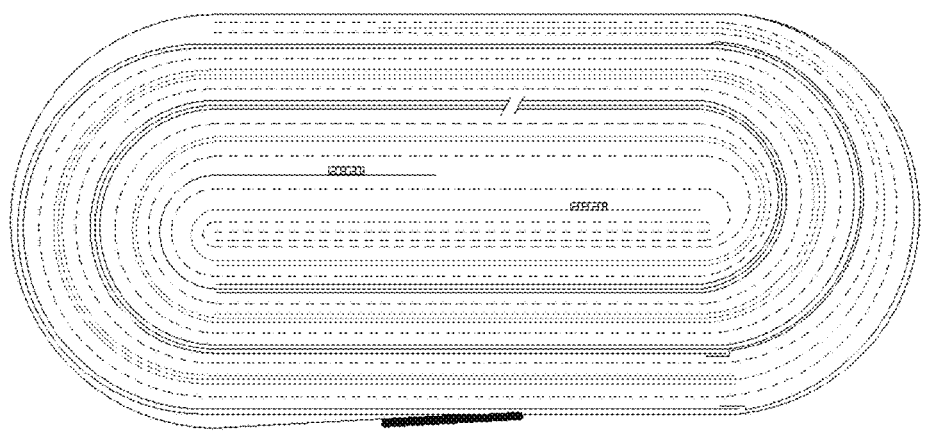
FIG. 1 is a structural schematic diagram of a secondary cell in the prior art.

1—flat-shaped cell;
10—first electrode plate;
11—first blank foil area;
12—first single-side coated area;
13—first blank current collector area;
20—second electrode plate;
21—second blank foil area;
22—second single-side coated area;
23—second blank current collector area;
24—second electrode plate back folded section;
30—first separator;
301—first separator back folded section;
40—second separator;
401—second separator back folded section;
50—first electrode tab;
60—second electrode tab;
L—central line of cell.

DESCRIPTION OF EMBODIMENTS

The present application will be further illustrated with reference to embodiments as follows. It should be understood that, these embodiments are only used to explain the present application rather than limit the scope of the present application. The expressions 'left' and 'right' in text are referring to the placing state of the cell of the secondary battery in the drawings.

Embodiments of the present application relates to a wound cell, which includes a flat-shaped cell 1 formed by winding of a first separator 30, a first electrode plate 10, a second separator 40 and a second electrode plate 20 from start ends thereof, a first electrode tab 50 is connected with the first electrode plate 10, a second electrode tab 60 is connected with the second electrode plate 20; the first electrode plate 10 includes a first current collector and a first active material coated on two opposite surfaces of the first current collector, the second electrode plate 20 includes a second current collector and a second active material coated on two opposite surfaces of the second current collector.

In an embodiment of the present application, an outermost circle of the second electrode plate 20 includes a second single-side coated area 22. A surface of second single-side coated area 22 facing the center of the wound cell is a second blank current collector area 23 which is not coated with the second active material, a portion of the first electrode plate 10 opposite to the second blank current collector area 23 includes a first single-side coated area 12, a surface of the first single-side coated area 12 away from the center of the wound cell is a first blank current collector area 13 which is not coated with the first active material. That is, in the present application, the tail end of the first electrode plate 10 and the tail end of the second electrode plate 20 are both provided with single-side coated areas, the side of the blank current collector in the single-side coated area forms an oppositely arranged armor area; when the cell is subject to abuse situations such as nailing or impact, the armor areas protect the cell so as to improve the cell safety performance.

In an embodiment of the present application, the tail end of the first electrode plate 10 includes a first blank foil area 11, a portion on the second electrode plate 20 opposite to the first blank foil area 11 includes a second blank foil area 21, an armor area opposite to the blank current collector is formed between the first blank foil area 11 and the second blank foil area 21, the blank foil area is an area with both surfaces uncoated. Similarly, the said armor area can improve the battery safety performance.

In an embodiment of the present application, the length of the first blank foil area 11 is no larger than the length of the first single-side coated area 12, and/or the length of the second blank foil area 21 is no larger than the length of the second single-side coated area 22.

Besides, with respect to the thickness direction of the flat-shaped cell 1, the start end of the first blank foil area 11 and the start end of the second single-surface coated area are located at the two opposite sides of the flat-shaped cell 1, so as to form the armor area at two opposite sides of the flat-shaped cell 1. Herein, the thickness direction of the flat-shaped cell 1 is parallel with a central line L of the flat-shaped cell 1, as shown in FIGS. 2-12. Therefore, no matter which side of the battery is subject to abuse situations such as nailing or impact, the armor areas at both sides can protect the battery, so as to significantly improve the battery safety performance. Furthermore, in the present application, the armor area at one side is formed by the single-surface coated areas of two electrode plates, compared with the armor area formed by a single-surface coated area of one electrode plate and a blank foil area of one electrode plate, the energy density of the cell can also be increased.

Figure 2:
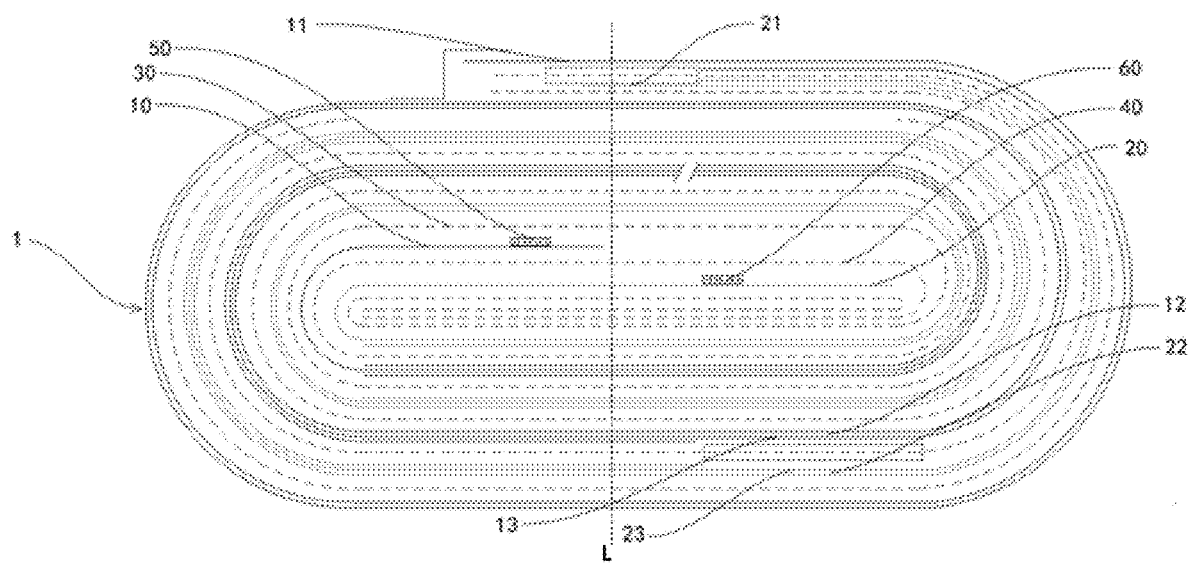
FIG. 2 is a structural schematic diagram of a wound cell according to an embodiment of the present application.

In an embodiment of the present application, when a first electrode tab 50 and a second electrode tab 60 are both located at a head portion of the electrode plate of the battery, as shown in FIG. 2, the distance from the first electrode tab 50 to the bending point of the first electrode plate 10 is larger than the distance from the second electrode tab 60 to the bending point of the second electrode plate 20, that is, when the battery is wound anti-clockwise, the first electrode tab 50 is located at the left side of the second electrode tab 60, in the projection along the thickness direction of the flat-shaped cell 1, the second single-side coated area 22 is overlapped with the second electrode tab 60, and the first blank foil area 11 is overlapped with the first electrode tab 50. In the present embodiment, two armor areas (shown as the dotted line) keep away from the thickest position of each electrode tab, so as to further reduce the cell thickness, and increase the cell energy density. Furthermore, the cell has a good symmetry, which can achieve better flatness of the cell, so as to prevent cell deformation.

Figure 3:
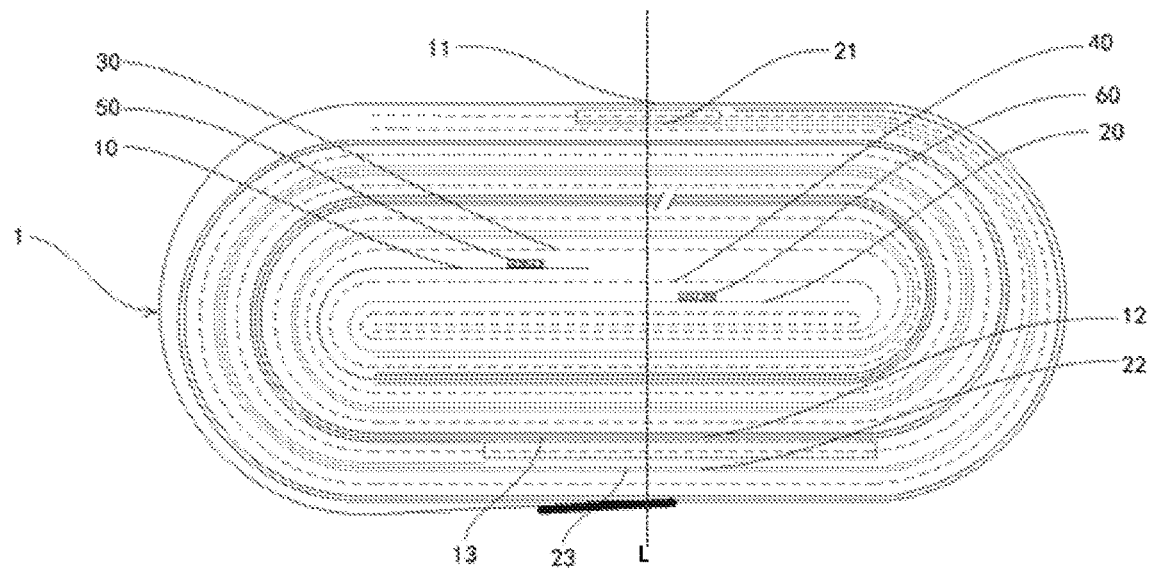
FIG. 3 is a structural schematic diagram of a wound cell according to an embodiment of the present application.

In an embodiment of the present application, as shown in FIG. 3, the first electrode tab 50 is located at the left side of the second electrode tab 60, in the projection along the thickness direction of the flat-shaped cell 1, the second single-side coated area 22 is overlapped with both the first electrode tab 50 and the second electrode tab 60, the first blank foil area 11 is overlapped with both the first electrode tab 50 and the second electrode tab 60. In the present embodiment, with respect to FIG. 2, increasing of the armor area further improves the cell safety performance. Since two armor areas (shown as the dotted line) keep away from thickest positions of all electrode tabs, so as to further reduce the cell thickness, and further increase the energy density of the cell. Furthermore, the cell has a good symmetry, so as to prevent cell deformation.

In an embodiment of the present application, the length of the first blank foil area 11 is larger than the length of the second blank foil area 21, the tail end of the first blank foil area 11 is fixed with the first electrode plate 10 around the outermost circle of the cell through glue for tail end, so as to complete winding of the cell.

In an embodiment of the present application, as shown in FIG. 2, with respect to the thickness direction of the flat-shaped cell 1, the start end of the first blank foil area 11 and the tail end of the first blank foil area 11 are both located at the same side of the flat-shaped cell 1. Such arrangement can further reduce the cell thickness, and save raw material.

In an embodiment of the present application, as shown in FIG. 3, with respect to the thickness direction of the flat-shaped cell 1, the start end of the first blank foil area 11 and the tail end of the first blank foil area 11 are located at two opposite sides of the flat-shaped cell 1. Such arrangement will make the first blank foil area 11 further coil the cell for an additional half-circle, so as to further improve the battery safety performance and facilitate battery preparation.

Figure 4:
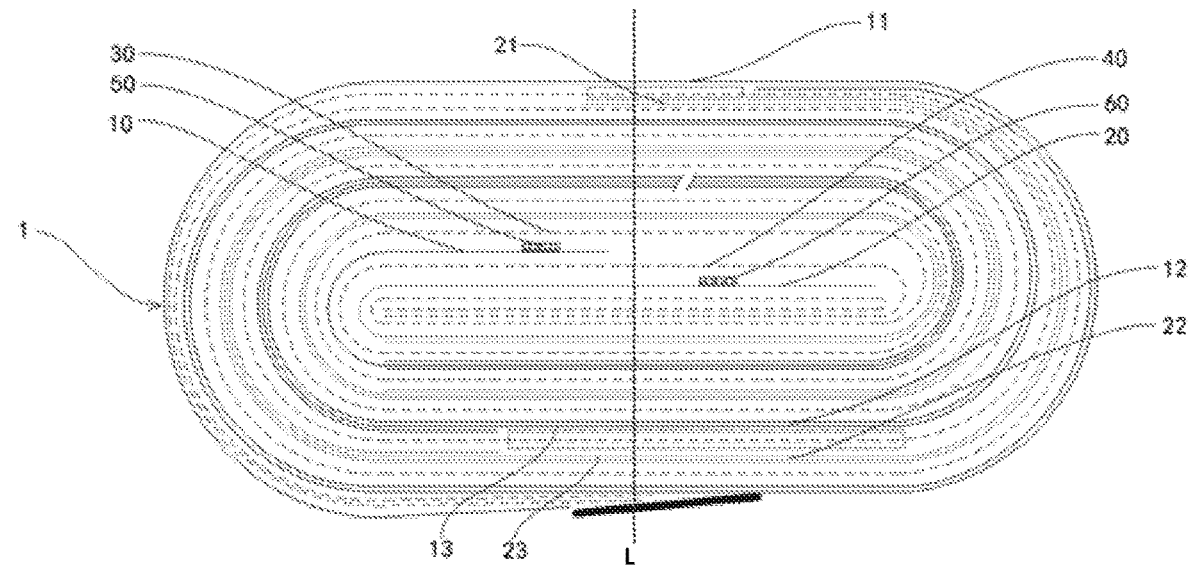
FIG. 4 is a structural schematic diagram of a wound cell according to an embodiment of the present application.

In an embodiment of the present application, as shown in FIG. 4, both the length of the first separator 30 and the length of the second separator 40 are larger than the length of the first blank foil area 11, which can increase friction between the and the aluminum foil package, and reduce the impact force suffered by the cell main body when dropping off, so as to improve anti-dropping performance of the cell.

Figure 5:
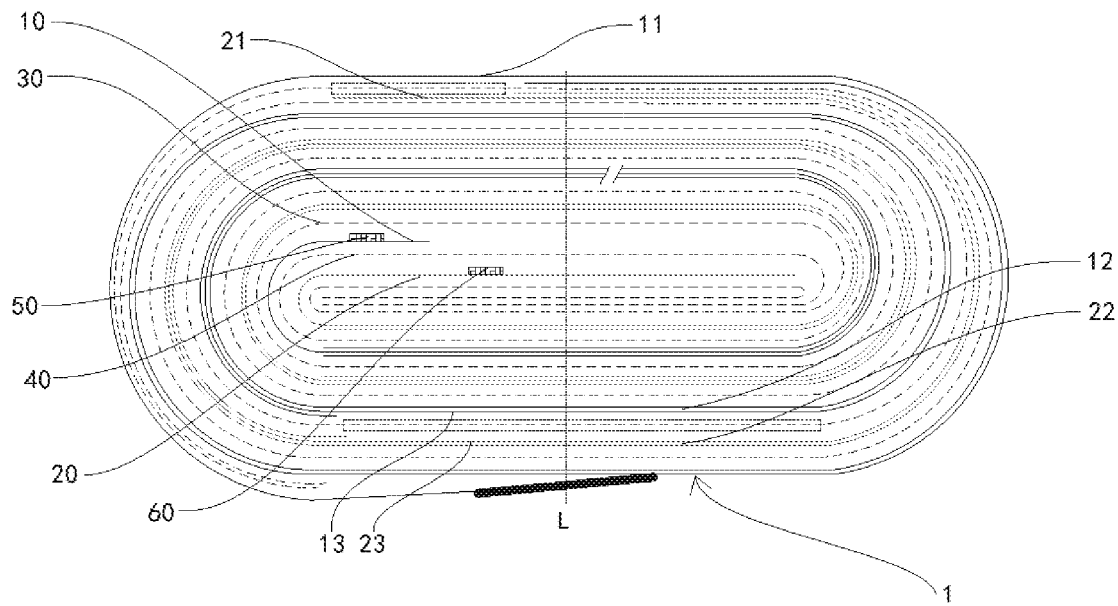
FIG. 5 is a structural schematic diagram of a wound cell according to an embodiment of the present application.
Figure 6:
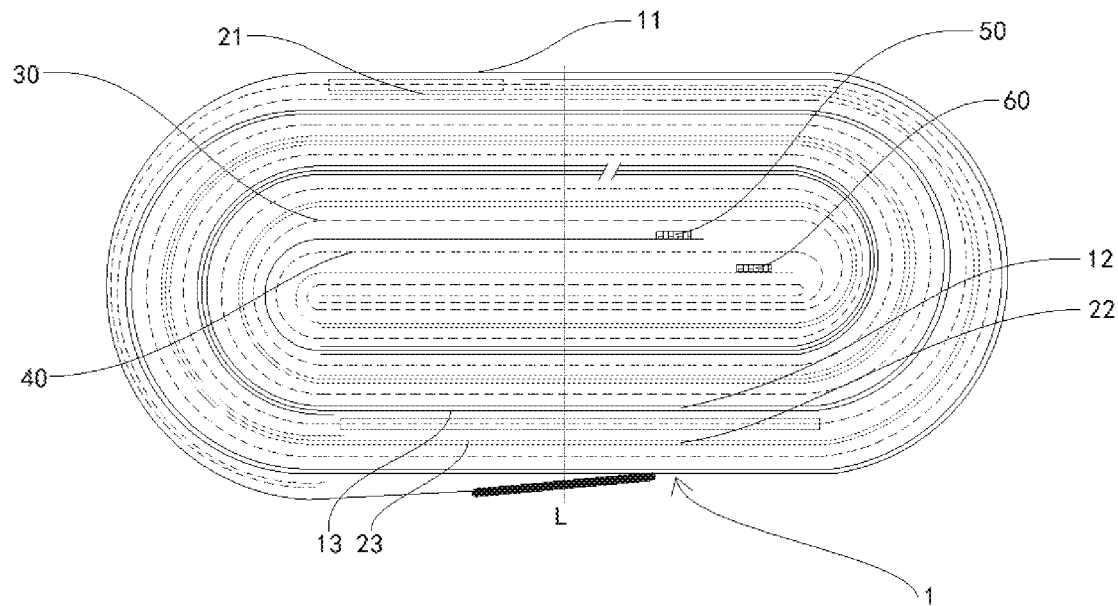
FIG. 6 is a structural schematic diagram of a wound cell according to an embodiment of the present application.
Figure 7:
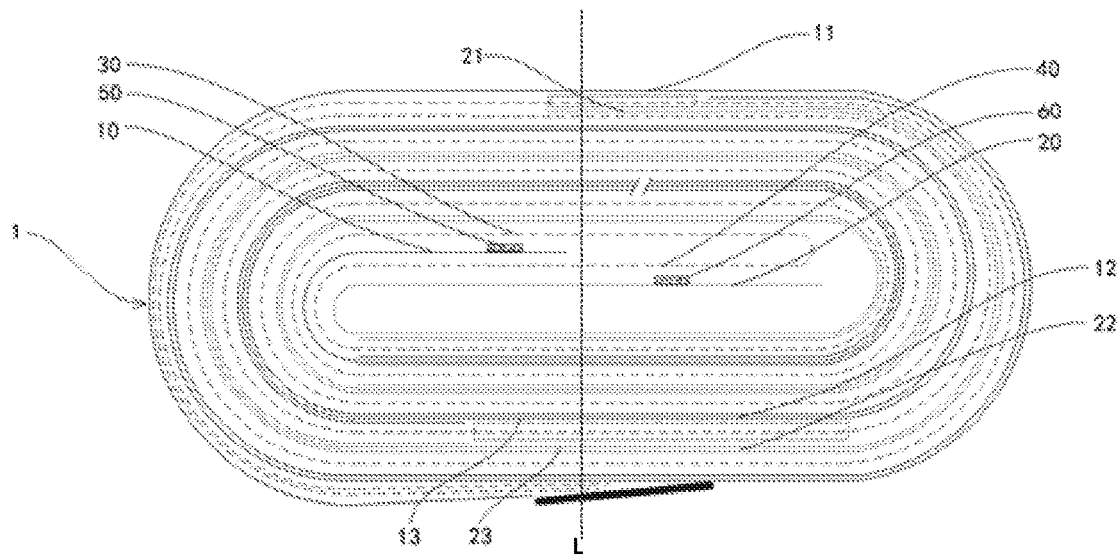
FIG. 7 is a structural schematic diagram of a wound cell according to an embodiment of the present application.
Figure 8:
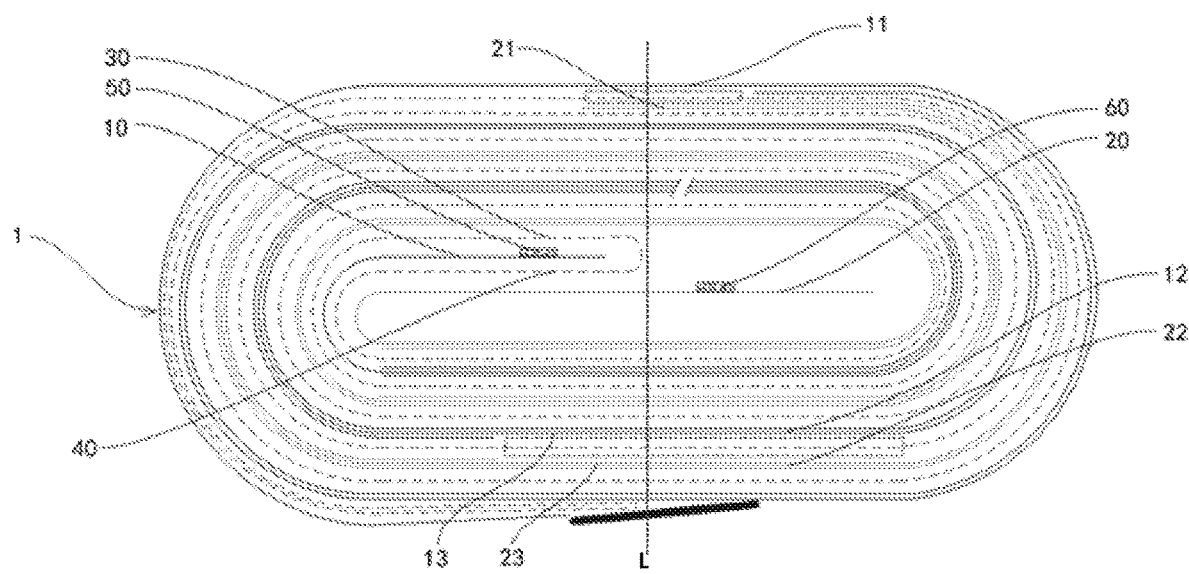
FIG. 8 is a structural schematic diagram of a wound cell according to an embodiment of the present application.
Figure 9:
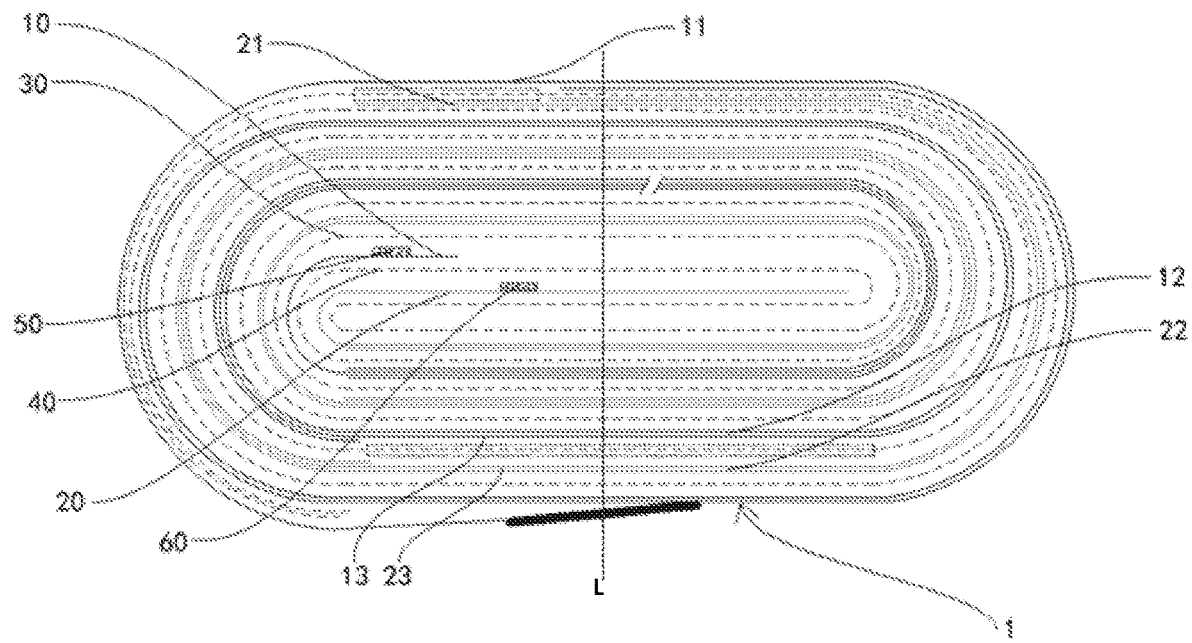
FIG. 9 is a structural schematic diagram of a wound cell according to an embodiment of the present application.

In an embodiment of the present application, the central line of the flat-shaped cell 1 in the width direction is a central line L of the cell; the first electrode tab 50 and the second electrode tab 60 are respectively located at two sides of the central line L of the cell, as shown from FIG. 2 to FIG. 4; the first electrode tab 50 and the second electrode tab 60 can also be located at the same side of the central line L of the cell, as shown in FIG. 5 and FIG. 6.

In an embodiment of the present application, as shown from FIG. 2 to FIG. 6, the arrangement of the separator can adopt a normal manner, that is, the first separator 30 and the second separator 40 are wound in the interior of the cell for a circle along the width direction of the flat-shaped cell 1, so as to form 4 layers of separators.

In an embodiment of the present application, other manners can be adopted to reduce the cell thickness, for example, the distance from the start end of the first separator 30 to the first electrode tab 50 is the length of the head portion of the first separator 30, the distance from the start end of the second separator 40 to the first electrode tab 50 is the length of the head portion of the second separator 40; the head portion of the first separator 30 and the head portion of the second separator 40 are arranged in parallel along the length direction of the flat-shaped cell 1. When the head portion of the first separator 30 and the head portion of the second separator 40 are arranged in parallel along the length direction of the flat-shaped cell 1, the start end of the first separator 30 can be connected with the start end of the second separator 40, that is, a whole separator is wound, as shown from FIG. 7 to FIG. 9. Adopting the whole separator for winding can further simplify the winding manner and the preparation process of the cell.

Figure 10:
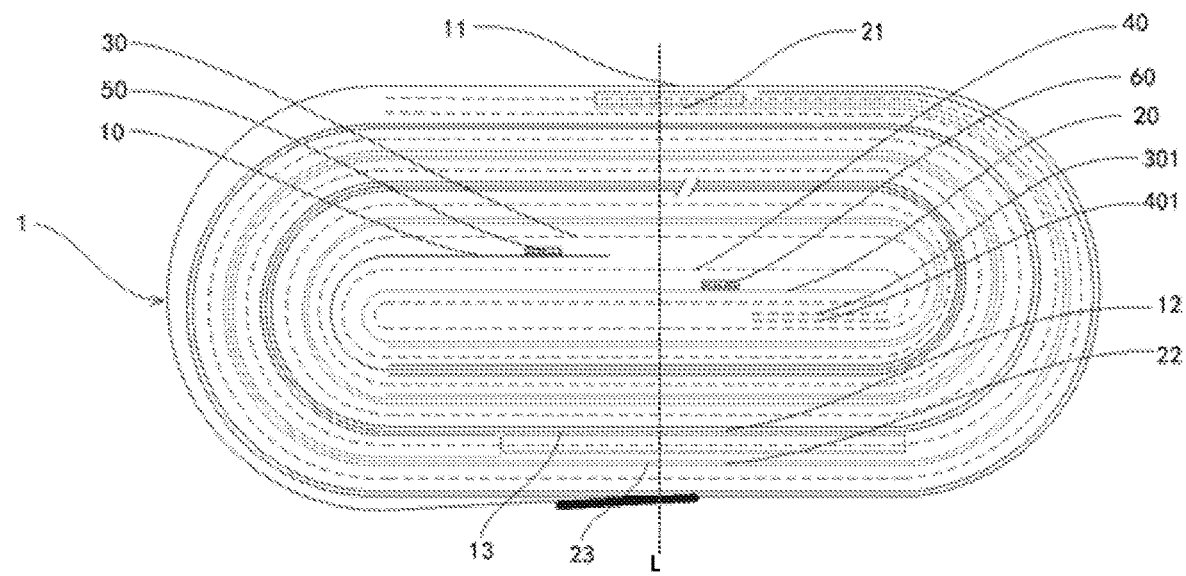
FIG. 10 is a structural schematic diagram of a wound cell according to an embodiment of the present application.

In an embodiment of the present application, the head portion of the first separator 30 can be back folded in the interior of the flat-shaped cell 1 to form a separator back folded section; the head portion of the first separator 30 and the head portion of the second separator 40 can be back folded in the interior of the flat-shaped cell 1 at the same time to respectively form a first separator back folded section 301 and a second separator back folded section 401. As shown in FIG. 10, in the projection along the thickness direction of the flat-shaped cell 1, the first separator back folded section 301 and the second separator back folded section 401 do not overlap the first electrode tab 50 or the second electrode tab 60, so as to achieve the effect of reducing the cell thickness for certain extent, so as to further increase the energy density.

Figure 11:
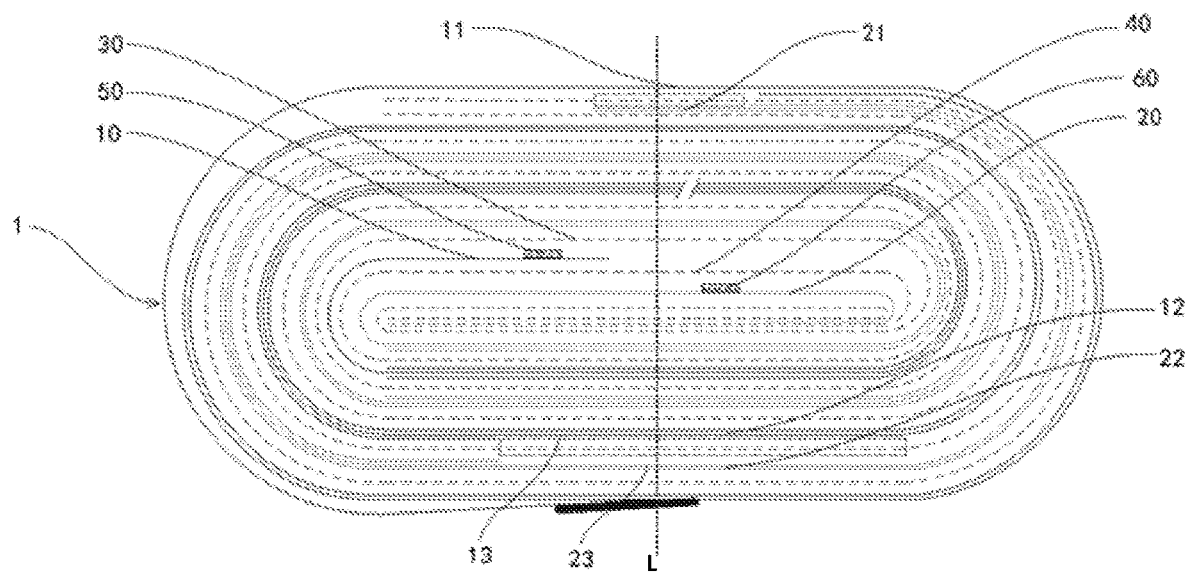
FIG. 11 is a structural schematic diagram of a wound cell according to an embodiment of the present application.

In order to facilitate winding of the battery, the head portion of the electrode plate can also be bended, the distance from the start end of the second electrode tab 20 to the second electrode tab 60 is the length of the head portion of the second electrode plate 20, the head portion of the second electrode plate 20 is folded in the interior of the flat-shaped cell 1 to form a second electrode plate back folded section 24, as shown in FIG. 11, the second electrode plate back folded section 24 does not overlap either the first electrode tab 50 or the second electrode tab 60.

Figure 12:
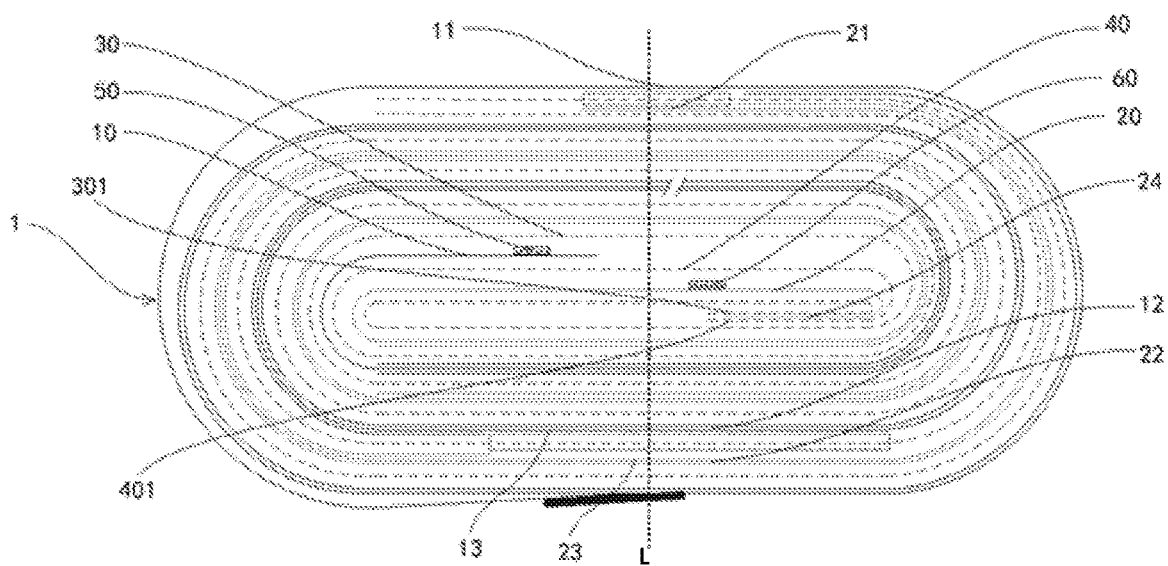
FIG. 12 is a structural schematic diagram of a wound cell according to an embodiment of the present application.

As shown in FIG. 12, the first separator 30 and the second separator 40 can be bended together with the second electrode plate 20, the formed back folded sections do not overlap either the first electrode tab 50 or the second electrode tab 60.

In an embodiment of the present application, the wound cell of the present application can be of a multi-electrode-tab structure, for example, an electrode tab can be welded at the blank cathode-anode current collector at the outermost circle, so as to increase the charge-discharge ratio performance thereof.

In an embodiment of the present application, the winding direction of the cell can be anti-clockwise or clockwise, which is decided according to the cell winding device.

In an embodiment of the present application, when the first electrode plate 10 is a positive electrode plate, the second electrode plate 20 is a negative electrode plate; or, when the first electrode plate 10 is a negative electrode plate, the second electrode tab 20 is a positive electrode plate.

Although the present application is disclosed by the preferred embodiments as above, which are not used to limit the claims, those skilled in the art can make any possible variations and modification according to the concept of the present application, therefore, the protection scope of the present application should the scope defined by the claims of the present application.

What is claimed is:

1. A wound cell, wherein the wound cell comprises a flat-shaped cell formed by winding of a first separator, a first electrode plate, a second separator and a second electrode plate from respective start ends thereof, a first electrode tab is connected with the first electrode plate, a second electrode tab is connected with the second electrode plate; the first electrode plate comprises a first current collector with a first active material coated on two opposite surfaces of the first current collector, the second electrode plate comprises a second current collector with a second active material coated on two opposite surfaces of the second current collector, wherein an outermost circle of the second electrode plate that is farthest from a center of the wound cell comprises a second single-side coated area, a surface of the second single-side coated area facing the center of the wound cell is a second blank current collector area which is not coated with the second active material and a surface of the second single-side coated area facing away from the center of the wound cell is coated with the second active material, a portion of the first electrode plate opposite to the second blank current collector area comprises a first single-side coated area, a surface of the first single-side coated area away from the center of the wound cell is a first blank current collector area which is not coated with the first active material and a surface of the first single-side coated area facing towards the center of the wound cell is coated with the first active material;

a tail end of the first electrode plate comprises a first blank foil area, a portion of the second electrode plate opposite to the first blank foil area comprises a second blank foil area;

with respect to the thickness direction of the flat-shaped cell, a start end of the first blank foil area and a start end of the second single-side coated area are respectively located at two opposite sides of the flat-shaped cell.

2. The wound cell according to claim 1, wherein a projection of the first electrode tab and/or the second electrode tab along a thickness direction of the flat-shaped cell overlaps with the second single-side coated area.

3. The wound cell according to claim 1, wherein a projection of the first electrode tab and/or the second electrode tab along the thickness direction of the flat-shaped cell overlaps with the first blank foil area.

4. The wound cell according to claim 1, wherein a length of the first blank foil area is larger than a length of the second blank foil area.

5. The wound cell according to claim 1, wherein a length of the first blank foil area is no larger than a length of the first single-side coated area, and/or a length of the second blank foil area is no larger than a length of the second single-side coated area.

6. The wound cell according to claim 1, wherein a length of the first separator and/or the second separator is larger than a length of the first blank foil area.

7. The wound cell according to claim 1, wherein a distance from the start end of the first separator to the first electrode tab is a length of a head portion of the first separator, a distance from the start end of the second separator to the first electrode tab is a length of a head portion of the second separator;

the head portion of the first separator is back folded in an interior of the flat-shaped cell to form a separator back folded section or both the head portion of the first separator and the head portion of the second separator are back folded in an interior of the flat-shaped cell to form a separator back folded section, and a projection of the separator back folded section along the thickness direction of the flat-shaped cell does not overlap with either the first electrode tab or the second electrode tab.

8. The wound cell according to claim 1, wherein a distance from the start end of the second electrode plate to the second electrode tab is a length of a head portion of the second electrode plate, the head portion of the second electrode plate is back folded in an interior of the flat-shaped cell to form a second electrode plate back folded section; and/or a distance from the start end of the first electrode plate to the first electrode tab is a length of a head portion of the first electrode plate, the head portion of the first electrode plate is back folded in the interior of the flat-shaped cell to form a first electrode plate back folded section; in a projection along the thickness direction of the flat-shaped cell, the first electrode plate back folded section and/or the second electrode plate back folded section do not overlap with either the first electrode tab or the second electrode tab.

9. The wound cell according to claim 1, wherein the start end of the first separator is connected with the start end of the second separator.

10. The wound cell according to claim 1, wherein the first electrode plate is a positive electrode plate, the second electrode plate is a negative electrode plate; or, the first electrode plate is a negative electrode plate, the second electrode plate is a positive electrode plate.

* * * * *